United States Patent Office 2,700,843
Patented Feb. 1, 1955

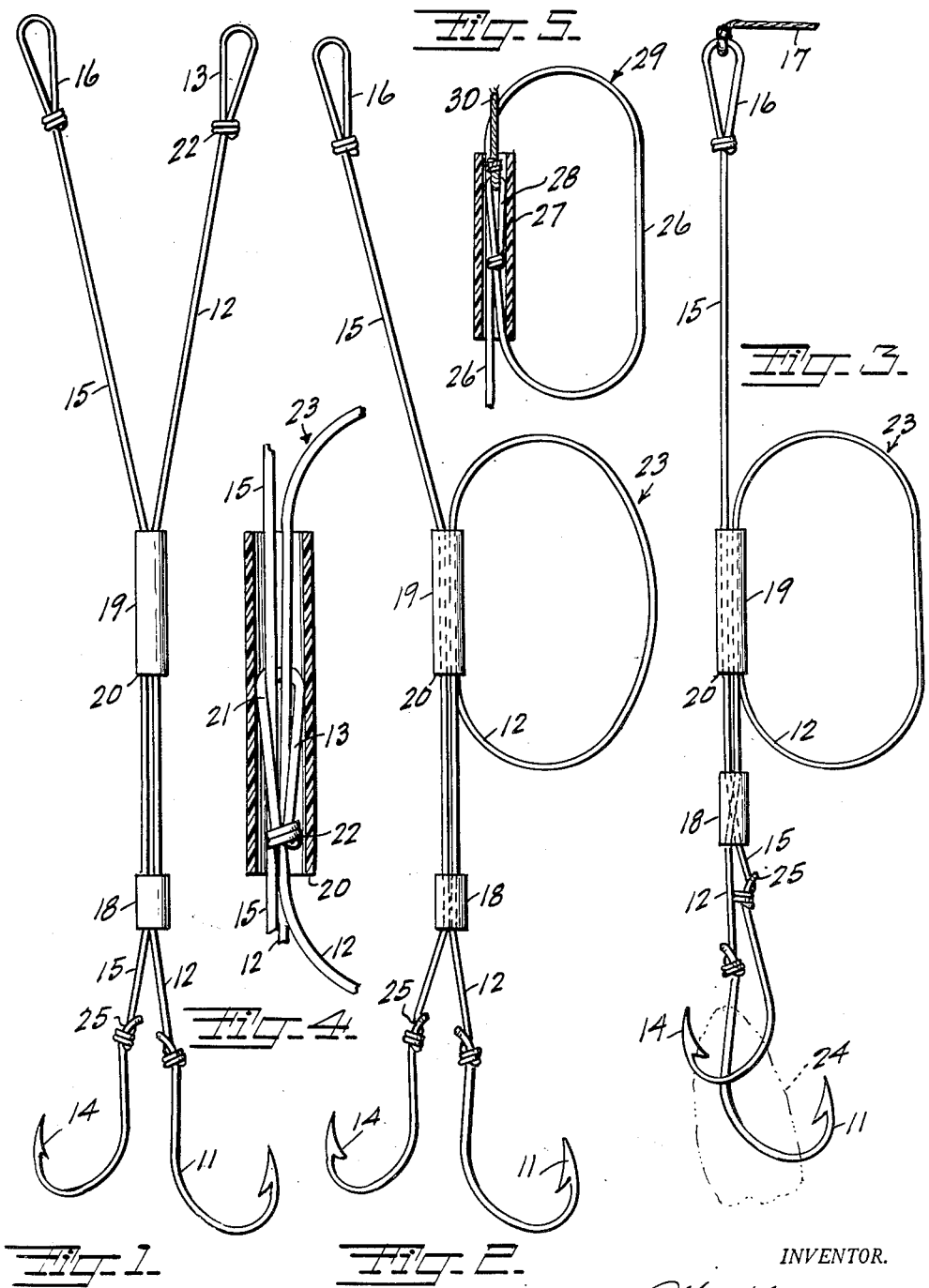

2,700,843

SLIP NOOSE FISHING LEADER

Albert Werner, Walnut Creek, Calif.

Application February 1, 1954, Serial No. 407,203

7 Claims. (Cl. 43—44.82)

This invention relates to improvements in methods of fishing, and chiefly concerns the catching of nibblers, which by use of conventional methods are seldom caught, and further concerns the effective hooking of a striking fish by employing the self-setting operation of a pair of hooks.

It is common in fishing practice to use a leader or snell of definite length attached at its opposite ends directly to the hook and to the line. With this arrangement, there is a positive stop when a fish attempts to make away with the bait, consequently the fish being frightened, lets go of the bait, and usually will not return to it. In some cases, the fish line is made free to slip relative to the sinker, but this provides absolutely free movement of the hook, and is therefore ineffective, because slight resistance is essential to cause the fish to snag itself when it attempts to make away with the bait.

I have found that the above disadvantages may be overcome by forming the snell or leader into a play-out loop, with the snell or leader lengthening out under slight frictional resistance when a fish tugs at the bait, so as not to alarm the fish. I have further found that the best way of accomplishing the desired results is to use two snelled hooks of different sizes having loops formed at one end, fix the looped end of the snell having the smaller hook thereon to the line or leader, with the hook applied through a small portion at the upper end of the bait, and then pass both snells through a resilient or flexible tubular member, with the loop of the snell of the larger hook inserted in the lower end of the tubular member, thus forming a play-out loop, the tubular member providing the required frictional resistance through which the larger hook can be pulled out relative to the end of the line.

With this arrangement, the fish may be caught by either of the two hooks initially, and if the larger hook is nibbled, the small hook will pull free of the small portion at the upper end of the bait, and with further nibbling and tugging, the larger hook will play out through the lengthening of its snell with consequent retraction of the play-out loop, and thus, with the fish gaining confidence, it suddenly tries to make away with the bait and thus becomes caught very effectively. For the foregoing reasons, the catch is greatly increased by my invention.

With this arrangement, the fish may be caught by either or both of the hooks. If the fish strikes one hook effectively, it may be caught by that hook, or if it grabs the bait over both hooks, then tries to make away with the bait, the one hook will remain substantially stationary relative to its point of attachment to the line while the other hook will pay out with the fish and thus both hooks come into action and thus effectively set in different points in the mouth of the fish.

The objects and advantages of the invention are as follows:

First, to provide a means of connecting a fish hook to a fishing line in which the hook has relatively slight resistance to a nibbling or striking fish as compared to the resistance at the point of attachment to the line.

Second, to provide a leader for a fishing line in which a slip noose is formed in the leader, in which the leader is looped to provide a set length substantially half its full length and so held under slight resistance to a nibbling fish and which will be lengthened to substantially full length through ordinary pull by a nibbling fish on the leader to cause the hook to set in the mouth of the fish when that position is reached.

Third, to provide a leader as outlined which eliminates the pull of the line and sinker while a fish is nibbling thereby causing the fish to believe the bait to be practically free and thus causing the fish to dash with the bait and thus become hooked either by the single hook or by a combination of the slip hook and a second hook on a nonlengthening leader to effectively set the hooks in the mouth of the fish.

Fourth, to provide a leader with a slip noose in conjunction with a friction sleeve through which the leader is threaded and in which the terminal loop is frictionally anchored, and to provide a second leader threaded through the same sleeve and retained under slight frictional resistance, to provide for setting of two hooks in the mouth of a fish, or to provide for substantially doubling the length of the connection between the fish line and the one hook.

In describing the invention reference will be had to the accompanying drawings, in which:

Fig. 1 illustrates in elevation the preferred embodiment showing the first stage of assembly.

Fig. 2 shows the completely assembled embodiment ready for use.

Fig. 3 illustrates the invention baited ready for fishing.

Fig. 4 is an enlarged vertical section through the friction sleeve which controls the feed of the snell of the larger hook.

Fig. 5 is a vertical section through another embodiment as applied to a leader.

This invention is an improvement over my copending application, Serial Number 318,858, filed November 5, 1952, for Slip Noose Fishing Leader in that two fishing leaders or snells are used and which can be arranged to provide substantially twice the lengthening between one hook and the point of attachment to the line, or which may be arranged as a self-setting combination with one hook fixed relative to the line and the other capable of lengthening under a pull by a fish, either to instill confidence when the fish is nibbling or to cause the two hooks to set in different areas in the mouth of the fish.

The fishing tackle illustrated in Figs. 1 to 4 includes two snelled hooks, the larger hook 11 having a snell 12 which terminates in a loop 13, while the smaller hook 14 also has a similar snell 15 terminating in a line attaching loop 16 by means of which it is attached to a leader or fishing line 17.

The two loops 13 and 16 are first threaded through a short sleeve 18 which may be formed of rubber or plastic of some resilient type such as a vinyl plastic, and then threaded through a longer sleeve 19 of the same material as the shorter sleeve, following which, both of the hooks and the short sleeve 18 are threaded through the loop 13 of the snell 12 which loop is then inserted into the lower end 20 of the longer sleeve 19 as indicated at 21 in Fig. 4, which shows both snells passing through the loop 13 with the loop 13 being inserted into the sleeve, the sleeve being of a size suitable to receive the two snells and the loop and knot 22 under slight frictional resistance, the completed article appearing as illustrated in Fig. 2, the snell 12 having been formed into a large loop 23.

With the loop 16 of the snell of the smaller hook 14 attached to the leader or fishing line 17, the bait 24 is baited on the larger hook 11, then with the smaller hook in opposed position as indicated in Fig. 3, this smaller hook is pierced through a small portion of the bait at the upper end, just enough to maintain the relative positions of the two hooks. The short sleeve 18 is slid down close to the eye 25 of the smaller hook, and the loop 23 is enlarged to its maximum, whereby the bottom 20 of the longer sleeve is positioned adjacent to the top of the shorter sleeve. As will be understood, the term snell applies equally to fishing leaders, since the same effect is obtained with leaders.

When a fish nibbles at the bait 24 it may be caught by either or both of the hooks. However, a slight jerk on the larger hook will cause the smaller hook to be disengaged from the bait, and the fish can continue nibbling with the snell extending with slight resistance, and almost certainly, the fish will then attempt to make away with the bait, the snell drawing out until the loop has drawn close around the wall of the larger sleeve, thus causing an instant stop which causes the fish to hook itself effectively.

As shown in Fig. 5, a similar operation and effect is obtained by omitting the smaller hook and smell and attaching the leader or line 30 to the loop 28 of the larger hook after the play-out loop 29 has been formed as shown, and with the loop 28 being drawn back into the sleeve for the snell and which embodiment is applicable to leaders or snells, and in which the snell 26 is threaded through the sleeve 27 from bottom to top, after which the line attaching loop 28 is threaded back through the bottom end and out through the top to form the play-out loop 29. The fishline 30 is then attached to the line attaching loop 28, after which the loop 28 is drawn back into the sleeve to provide the necessary friction for suitable playout of the leader under slight resistance.

I claim:

1. Fishing tackle comprising a snelled fish hook having a loop formed at one end of the snell, and a resilient sleeve threaded on said snell, a portion of said snell forming a play-out loop about the side wall of the sleeve through insertion of the loop formed at said one end of the snell into the lower end of the sleeve, said sleeve having an inside diameter of such size as to frictionally engage the portions of said snell positioned therein to maintain the play-out loop of said snell under slight resistance against retraction.

2. Fishing tackle as defined in claim 1; a second snelled fish hook having a line attaching loop formed at the terminal end of the snell, the end loops of the snells of both hooks being first threaded through said sleeve, and then both hooks are threaded through the end loop of said first mentioned snell previous to insertion of the end loop into the lower end of the sleeve, and a fishing line attached to the line attaching loop of the said second snelled fish hook.

3. Fishing tackle as defined in claim 2, a guide sleeve threaded onto said snells previous to the threading of the first mentioned sleeve and being positioned adjacent to the eye of the hook of the second snelled hook to maintain the two hooks in close relationship while fishing.

4. Fishing tackle as defined in claim 3 in which the two hooks are of different sizes with the first mentioned hook being the larger hook, and adapted to be baited, the smaller hook being adapted to be inserted in a small portion of the upper end of the bait for release under slight pull on the first mentioned hook by a fish.

5. A slip noose device for a fish hook comprising a leader, and a sleeve of relatively resilient material threaded onto said leader, said leader having a terminal loop, the leader being formed into a loop over the top and about the side of said sleeve, said terminal loop being inserted in the lower end of said sleeve, said sleeve having an inside diameter of such size as to frictionally engage the portion of said leader positioned therein to retain said leader against relative movement under slight resistance.

6. Fishing tackle comprising two snelled hooks of different sizes, each snell terminating in an end loop, a first sleeve of relatively flexible material threaded onto said snells, and a second sleeve of similar material threaded onto said snells with both end loops extending from the upper end of the sleeve, both hooks being threaded through the end loop of the snell of the larger hook, the looped end of the snell of the larger hook being inserted into the lower end of the second sleeve to form a play-out loop, the second sleeve having an inside surface frictionally retaining the portions of said snells positioned therein for restraining withdrawal of the snell of the larger hook under slight frictional resistance.

7. Fishing tackle comprising two snelled hooks each snell having a hook at one end and a loop formed at the other end, and two friction sleeves, said snells being threaded through said friction sleeves, said hooks and one of said friction sleeves being threaded through the end loop on one of said snells, with the other one of said end loops being adapted for attachment to a fishing line, the end loop of said one of said snells being inserted within the other one of said friction sleeves, said other one of said sleeves having an inside diameter of such size as to frictionally engage the portions of said snells and said one of said loops positioned therein, whereby one of said hooks is fixed relative to the point of attachment to the line while the other one of said hooks is extendable for causing setting of the hooks in the mouth of a fish.

References Cited in the file of this patent

UNITED STATES PATENTS

| | | |
|---|---|---|
| 676,962 | Payton | June 25, 1901 |
| 1,438,476 | Bley | Dec. 12, 1922 |
| 1,863,125 | Powell | June 14, 1932 |
| 2,572,616 | Hansen | Oct. 23, 1951 |
| 2,674,824 | Werner | Apr. 13, 1954 |